United States Patent [19]
Babcock et al.

[11] Patent Number: 5,281,005
[45] Date of Patent: Jan. 25, 1994

[54] SPINDLE RETAINER FOR AXLE HOUSING

[75] Inventors: Keith A. Babcock, Roanoke; Mark L. Beakas, Auburn; Ted J. Kaufman, Ossian; Kraig J. Schlosser, Fort Wayne, all of Ind.

[73] Assignee: Dana Corporation, Toledo, Ohio

[21] Appl. No.: 923,245

[22] Filed: Jul. 31, 1992

[51] Int. Cl.⁵ .............................................. B60B 35/04
[52] U.S. Cl. ................................. 301/132; 301/124.1; 285/305
[58] Field of Search ...................... 301/109, 111, 124.1, 301/124.2, 126, 130, 131, 128, 137, 132; 403/362, 377, 378; 285/369, 403, 404, 305

[56] References Cited

U.S. PATENT DOCUMENTS

| | | |
|---|---|---|
| 153,034 | 7/1874 | Arnold et al. |
| 254,625 | 3/1882 | Deisher et al. |
| 353,218 | 11/1886 | Harrington ........................ 301/120 |
| 894,131 | 7/1908 | Frederick . |
| 965,131 | 7/1910 | Bliss . |
| 1,243,401 | 10/1917 | Griswold . |
| 1,393,040 | 10/1921 | Richard et al. ................. 285/305 X |
| 1,480,223 | 1/1924 | Robechaud ....................... 301/130 |
| 1,899,347 | 2/1933 | Mogford et al. . |
| 2,168,499 | 8/1939 | Spicacci . |
| 2,540,459 | 2/1951 | Ronayne ........................ 301/128 X |
| 3,759,554 | 9/1973 | Carter .............................. 285/305 X |
| 4,289,339 | 9/1981 | Hansen .............................. 403/378 X |
| 4,389,945 | 6/1983 | Bahrle et al. . |
| 4,906,031 | 3/1990 | Vyse ................................ 285/305 X |
| 5,022,333 | 6/1991 | McClure et al. ................. 301/111 X |
| 5,121,808 | 6/1992 | Visentini et al. ............... 301/128 X |

FOREIGN PATENT DOCUMENTS

| 20690 | of 1912 | United Kingdom ................ 301/128 |
| 1499479 | 2/1978 | United Kingdom ................ 301/128 |

Primary Examiner—Russell D. Stormer
Attorney, Agent, or Firm—MacMillan, Sobanski & Todd

[57] ABSTRACT

A structure for positively retaining a journal portion of a spindle in a tube portion of a vehicle axle housing includes a transverse aperture formed through the tube portion near the outer end thereof. The aperture extends partially into the interior of the tube portion and is defined by a radius of curvature. A generally hollow cylindrical spindle is connected to the end of the tube portion. The spindle includes a journal portion which is telescopically received within the hollow tube portion. An annular groove is formed in the outer surface of the journal portion of the spindle near the inner end thereof. The groove is defined by a radius of curvature which is substantially larger than the radius of curvature defining the transverse aperture. When the spindle is inserted within the tube portion, the groove is aligned with the transverse aperture. A threaded fastener is disposed within the transverse aperture. The threaded fastener has a radius of curvature which is slightly smaller than the radius of curvature of the transverse aperture. The threaded fastener prevents the removal of the journal portion from the tube portion, thereby positively retaining the spindle within the axle housing.

18 Claims, 1 Drawing Sheet

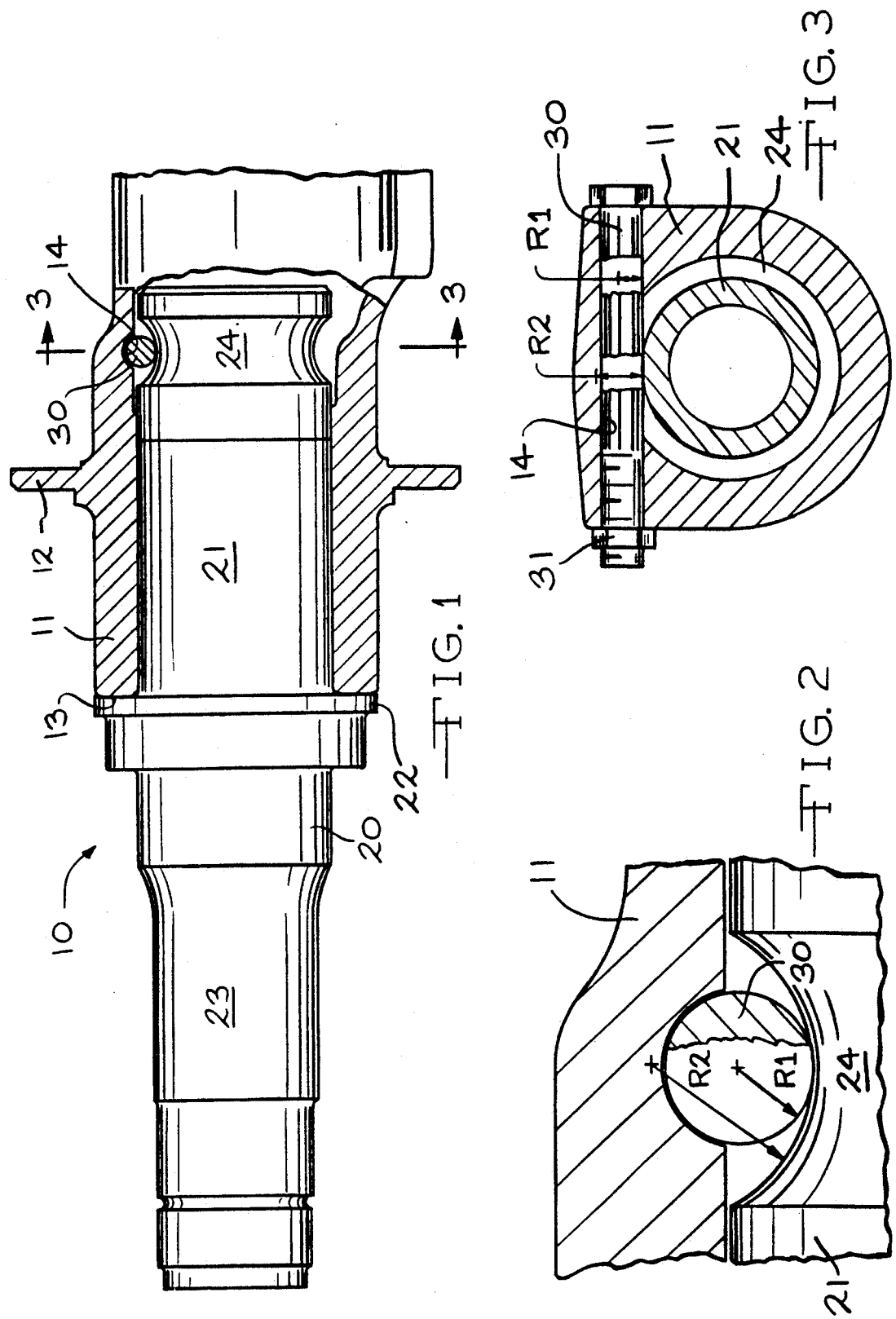

5,281,005

SPINDLE RETAINER FOR AXLE HOUSING

BACKGROUND OF THE INVENTION

This invention relates in general to axle assemblies for vehicles and in particular to an improved structure for positively retaining a spindle which is press fit into a hollow tube portion of a housing for such an axle assembly.

Axle assemblies are well known structures which are in common use in most vehicles. Such axle assemblies include a number of components which are adapted to transmit rotational power from an engine of the vehicle to the wheels thereof. These rotatable components are usually enclosed in a protective non-rotatable axle housing. Typically, the axle housing includes a central carrier portion having a pair of hollow tube portions extending outwardly therefrom. A differential is rotatably supported within the carrier portion of the axle housing, while a pair of rotatable axle shafts are enclosed within and extend through the tube portions. The differential is connected between an input drive shaft extending from the vehicle engine and the pair of output axle shafts. The axle shafts extend through the tube portions to rotatably drive wheels of the vehicle. Thus, the carrier portion and the tube portions form a housing for the axle assembly, inasmuch as the differential and the axle shafts are supported for rotation therein.

A typical axle housing further includes a pair of hollow spindles which are connected to the outer ends of the tube portions. The spindles are adapted to support the wheels of the vehicle thereon for relative rotation, usually by means of tapered roller bearings. For the sake of economy, the spindles are generally not formed integrally with the other portions of the axle housing. This is because the spindles must withstand the wear caused by supporting the vehicle wheels thereon. As a result, the spindles are usually formed from a higher grade (and, consequently, more expensive) material than the carrier portion and the tube portions of the axle housing, which are not subjected to such wear.

In non-steering axles, the spindles are directly connected to the tube portions of the axle housing. To accomplish this, the inner ends of the spindles are typically inserted telescopically within the outer ends of the tube portions. Frequently, the spindles are then permanently secured to the tube portions, such as by friction welding, so as to prevent the removal thereof. However, in some instances, it is desirable to permit removal of the spindles from the tube portions. In those instances, the spindles are typically press fit into the tube portions so as to provide a frictional engagement which prevents the removal thereof during normal operating conditions.

In those axle housings which provide removable spindles, it has been found desirable to provide a positive retainer for preventing the spindles from being removed from the tube portions under unusual operating conditions. Several positive spindle retaining structures are known in the art. However, it has been found that such known structures are relatively expensive to produce because of the amount of material required to effect a reliable retainment of the spindles or because of difficulties in manufacture and assembly. Accordingly, it would be desirable to provide an improved positive spindle retaining structure for a vehicle axle housing which simpler and less expensive to manufacture and assemble than known structures.

SUMMARY OF THE INVENTION

This invention relates to an improved structure for positively retaining a spindle in a vehicle axle housing. The axle housing includes a central carrier portion having a pair of generally hollow cylindrical tube portions extending outwardly therefrom. A transverse aperture is formed through each of the tube portions near the outer ends thereof. Each of the apertures extends partially into the interior of the associated tube portion and is defined by a radius of curvature. A pair of generally hollow cylindrical spindles is connected to the ends of the tube portions. Each of the spindles includes a journal portion which is telescopically received within the associated hollow tube portions. An annular groove is formed in the outer surfaces of the journal portions of the spindles near the inner ends thereof. Each of the grooves is defined by a radius of curvature which is substantially larger than the radius of curvature defining the transverse apertures. When the spindles are inserted within the tube portions, the grooves are aligned with the transverse apertures. A threaded fastener is disposed within each of the transverse apertures. Each of the threaded fastener has a radius of curvature which is slightly smaller than the radius of curvature of the transverse aperture. The threaded fasteners prevent the removal of the journal portions from the associated tube portions, thereby positively retaining the spindles within the axle housing.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a side elevational view, partially in cross section, of an end portion of a vehicle axle housing including a positive spindle retaining structure in accordance with this invention.

FIG. 2 is an enlarged view of a portion of the positive spindle retaining structure illustrated in FIG. 1.

FIG. 3 is a sectional elevational view taken along line 3—3 of FIG. 1.

DETAILED DESCRIPTION OF THE PREFERRED EMBODIMENT

Referring now to the drawings, there is illustrated in FIG. 1 an end portion of an axle housing, indicated generally at 10, for a vehicle axle assembly in accordance with this invention. The axle housing 10 includes a central carrier portion (not shown) having a pair of generally hollow cylindrical tube portions 11 (only one of which is illustrated) extending outwardly therefrom. The two tube portions 11 are similar in structure and, for the sake of clarity, are not both illustrated. The tube portions 11 may be formed or otherwise provided with conventional shock absorber pads (not shown), spring seats (not shown), and brake mounting flanges 12 (only one of which is shown). Each of the tube portions 11 terminates in an annular end surface 13. As mentioned above, the axle housing 10 is adapted to provide a protective enclosure for the rotatable drive train components (not shown) of the axle assembly 10.

A pair of transverse apertures 14 (only one is illustrated) is formed through the tube portions 11 of the axle housing 10 near the outer ends thereof. Each of the apertures 14 extends partially into and through the interior of the associated tube portion 11. Also, each of the apertures 14 is defined by a radius of curvature R1 (see FIGS. 2 and 3). The purpose of these transverse apertures 14 will be described in detail below.

A pair of generally hollow cylindrical spindles 20 (only one of which is illustrated) is connected to the ends of the tube portions 11 of the axle housing 10. Each of the spindles 20 includes a journal portion 21, a radially outwardly extending shoulder portion 22, and a wheel mounting portion 23. As best shown in FIG. 1, the journal portion 21 of the spindle 20 is telescopically received within the hollow tube portion 11 of the axle housing 10. This is accomplished by inserting the journal portion 21 through the open outer end of the tube portion 11 and pressing it inwardly until the shoulder portion 22 of the spindle 20 engages the end surface 13 of the tube portion 11. Thus, the shoulder portion 22 provides a positive stop for properly positioning the spindle 20 relative to the tube portion 11 during assembly.

As previously mentioned, it is preferable that the outer diameter of the journal portion 21 of the spindle 20 be approximately equal to the inner diameter of the tube portion 11. Thus, the journal portion 21 is press fit into the tube portion 11 when assembled in the manner described above. As a result, the spindle 20 is frictionally engaged and retained within the tube portion 11. Such frictional engagement prevents the removal of the spindle 20 from the tube portion 11 during normal operating conditions of the axle housing 10. As previously mentioned, the wheel mounting portions 23 of the spindles 20 support the wheels of the vehicle thereon for relative rotation, usually by means of tapered roller bearings. Thus, the spindles 20 can be removed from the tube portions 11 if desired, such as for service or replacement.

A pair of annular grooves 24 (only one is illustrated) are formed in the outer surfaces of the journal portions 21 of the spindles 20 near the inner ends thereof. Each of the grooves 24 is defined by a radius of curvature R2 (see FIGS. 2 and 3) which is substantially larger than the radius of curvature R1 defining the transverse apertures 14. When the spindle 20 is inserted within the tube portion 11 as described above, the groove 24 is aligned with the transverse aperture 14, as best shown in FIG. 1. The purpose of these grooves 24 will be described in detail below.

Means are provided for positively retaining the spindles 20 within the associated tube portions 11 to prevent the undesired removal thereof, such as might occur under unusual operating conditions. In the illustrated embodiment, this positive spindle retaining means includes a threaded fastener 30 which is disposed within the transverse aperture 14. The threaded fastener 30 has a radius of curvature which is slightly smaller than the radius of curvature R1 of the transverse aperture 14. Thus, the threaded fastener 30 can slide freely into and out of the transverse aperture 14 without binding, yet is prevented from substantially moving laterally relative to the tube portion 11. A nut 31 is threaded onto the end of the threaded fastener 30 to secure it to the tube portion 11 and retain it within the transverse aperture 14.

As shown in the drawings, the threaded fastener 30 extends through a portion of the annular groove 24 formed in the inner end of the journal portion 21 of the spindle 20. Consequently, the threaded fastener 30 prevents the removal of the spindle 20 from the tube portion 11 of the axle housing 10. This blocking engagement between the threaded fastener 30 and the inner end of the journal portion 21 of the spindle 20 functions to positively retain the spindle 20 within the tube portions 11, even during unusual operating conditions. When it is desired to remove the spindle 20 from the tube portion 11, the nut 31 is removed from the threaded fastener 30. The threaded fastener 30 is then removed from the transverse aperture 14, allowing the spindle 20 to be removed from the tube portion 11 using conventional tools.

As discussed above, the radius of curvature R2 of the annular groove 24 is substantially larger than the radius of curvature R1 of the transverse aperture 14. In a typical axle assembly wherein the outer diameter of the journal portion 21 of the spindle 20 is approximately 4.10 inches, the radius of curvature R2 of the annular groove 24 may be approximately 0.750 inch, while the radius of curvature R1 of the transverse aperture 14 (and the threaded fastener 30 disposed therein) may be approximately 0.375 inch. Because the radius of curvature R2 of the annular groove 24 is substantially larger than the radius of curvature R1 of the transverse aperture 14 and the threaded fastener 30, several important advantages are achieved by the structure of this invention over known positive spindle retaining structures.

First, the structure of this invention is simple to manufacture. The necessity of precision machining to accurately locate the transverse aperture 14 relative to the annular groove 24 on the journal portion 21 of the spindle 20 is obviated. This is because the relatively large radius of curvature R2 of the annular groove 24 can accommodate variations in its position relative to the transverse aperture 14. In other words, the annular groove 24 may be slightly misaligned with the transverse aperture 14 when the spindle 20 is installed in the tube portion 11, yet still easily permit the threaded fastener 30 to pass therethrough. Accordingly, both manufacture and assembly of the retaining structure is facilitated.

Second, because the radius of curvature R2 of the annular groove 24 is substantially larger than the radius of curvature R1 of the transverse aperture 14, a force attempting to remove the journal portion 21 of the spindle 20 from the tube portion 11 will cause the threaded fastener 30 to act like a wedge. As a result, the threaded fastener 30 would have to shear longitudinally in order for the journal portion 21 to be removed from the tube portion 11. Because the cross sectional area of the threaded fastener 30 to be sheared is larger, more force is required to accomplish removal of the spindle 20 from the tube portion 11.

The structure of this invention has been described with the transverse aperture 14, the annular groove 24, and the threaded fastener 30 all having circular cross sections. However, it will be appreciated that these components may be formed having other cross sectional shapes. For example, the annular groove 24 may be formed having an elliptical or tapered cross sectional shapes, and the threaded fastener 30 may have a square cross sectional shape. Similarly, the aperture 14 need not extend 1,5 transversely to the tube portion 11, and the groove 24 need not extend completely about the journal portion 23 of the spindle. The structure of this invention will function in the manner described above so long as a dimension defining the groove 24 is substantially larger than a dimension defining the aperture 14.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An end portion of an axle housing comprising:
   a hollow tube portion defining an interior and a longitudinal axis, said tube portion having an aperture formed therethrough which extends tangentially relative to said longitudinal axial and at least partially into the into the interior of said tube portion, said aperture including a curved surface defining a first dimension;
   a spindle including a journal portion disposed within said interior of said tube portion, said journal portion having a groove formed outer surface thereof which is aligned with said aperture, said groove including a curved surface defining a second dimension, said second dimension being larger than said first dimension; and
   a retainer disposed within said aperture and extending through at least a portion of said groove to positively retain said spindle in said tube portion, said larger second dimension providing a greater area of contact between said spindle and said retainer than if said second dimension was equal to said first dimension.

2. The axle housing end portion defined in claim 1 wherein said aperture extends transverse to said tube portion.

3. The axle housing end portion defined in claim 1 wherein said groove is an angular groove which extends completely about an outer surface of said journal portion of said spindle.

4. The axle housing end portion defined in claim 1 wherein said aperture has a circular cross section and said first dimension is a first radius defined by said circular cross section.

5. The axle housing end portion defined in claim 4 wherein said groove has a circular cross section and said second dimension is a second radius defined by said circular cross section, said second radius being substantially larger than said first radius.

6. The axle housing end portion defined in claim 1 wherein said retainer is a threaded fastener.

7. The axle housing end portion defined in claim 6 wherein said threaded fastener has a circular cross section.

8. The axle housing end portion defined in claim 6 wherein said aperture extends completely through said tube portion and said threaded fastener extends completely through said aperture.

9. The axle housing end portion defined in claim 8 further including a nut threaded onto said threaded fastener to secure said threaded fastener to said the tube portion and to retain it within said aperture.

10. An axle housing comprising:
    a carrier portion;
    a pair of hollow tube portions extending outwardly from said carrier portion, each of said tube portions defining an interior and a longitudinal axis, each of said tube portions having an aperture formed therethrough which extends tangentially relative to tis longitudinal axis and at least partially into the interior thereof, each or said apertures including a curved surface defining a first dimension;
    a pair of spindles including respective journal portions disposed within said interiors of said tube portions, each of said journal portions having a groove formed in an outer surface thereof, said grooves being aligned with said apertures, each of said grooves including a curved surface defining a second dimension, said second dimension being larger than said first dimension; and
    a retainer disposed within each of said apertures and extending through at least a portion of said associated groove to positively retain said spindles in said tube portions, said larger second dimension providing a greater area of contact between said spindle and said retainer than is said second dimension was equal to said first dimension.

11. The axle housing defined in claim 10 wherein said aperture extends transverse to said tube portion.

12. The axle housing defined in claim 10 wherein said groove is an annular groove which extends completely about an outer surface of annular portion of said spindle.

13. The axle housing defined in claim 10 wherein said aperture has a circular cross section and said first dimension is a first radius defined by said circular cross section.

14. The axle housing defined in claim 13 wherein said groove has a cross section and said second dimension is a second radius defined by said circular cross section, said second radius being substantially larger than said first radius.

15. The axle housing defined in claim 10 wherein said retainer is a threaded fastener.

16. The axle housing defined in claim 15 wherein said threaded fastener has a circular cross section.

17. The axle housing defined in claim 15 wherein said aperture extends completely through said tube portion and said threaded fastener extends completely through said aperture.

18. The axle housing defined in claim 17 further including a nut threaded onto said threaded fastener to secure said threaded fastener to said the tube portion and to retain it within said aperture.

* * * * *

UNITED STATES PATENT AND TRADEMARK OFFICE
CERTIFICATE OF CORRECTION

PATENT NO. : 5,281,005

DATED : January 25, 1994

INVENTOR(S) : Keith A. Babcock et al.

It is certified that error appears in the above-identified patent and that said Letters Patent is hereby corrected as shown below:

Column 5:

Claim 1, line 13, after "longitudinal", change "axial" to -- axis -- line 14, after "tially", delete -- into the --.

line 19, after "formed", insert -- in an --.

Claim 3, line 35, after "an", change "angular" to -- annular --.

Column 6:

Claim 10, line 11, after "to", change "tis" to -- its --.

line 13, after "each", change "or" to -- of --.

line 28, after "than", change "is" to -- if --.

UNITED STATES PATENT AND TRADEMARK OFFICE
CERTIFICATE OF CORRECTION

PATENT NO. : 5,281,005

DATED : January 25, 1994

INVENTOR(S) : Keith A. Babcock et al

It is certified that error appears in the above-identified patent and that said Letters Patent is hereby corrected as shown below:

Column 6:

Claim 12, line 34, before "portion", change annular" to -- said journal --.

Claim 14, line 40, after "a", insert -- circular --.

Signed and Sealed this

Second Day of August, 1994

*Attest:*

BRUCE LEHMAN

*Attesting Officer*  *Commissioner of Patents and Trademarks*